(12) United States Patent
Kwong et al.

(10) Patent No.: US 10,492,190 B2
(45) Date of Patent: *Nov. 26, 2019

(54) CHANGING RADIO BEARER CONFIGURATION OR STATE

(71) Applicant: TELEFONAKTIEBOLAGET LM ERICSSON (PUBL), Stockholm (SE)

(72) Inventors: Waikwok Kwong, Solna (SE); Alessandro Caverni, Stockholm (SE); Bo Hellander, Täby (SE); Patrik Karlsson, Stockholm (SE); Fredrik Ovesjö, Älvsjö (SE); Jose Luis Pradas, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 176 days.

This patent is subject to a terminal disclaimer.

(21) Appl. No.: 15/355,181

(22) Filed: Nov. 18, 2016

(65) Prior Publication Data

US 2017/0071026 A1 Mar. 9, 2017

Related U.S. Application Data

(63) Continuation of application No. 14/238,909, filed as application No. PCT/SE2014/050010 on Jan. 7, 2014, now Pat. No. 9,516,692.

(Continued)

(51) Int. Cl.
*H04W 28/18* (2009.01)
*H04W 72/04* (2009.01)
(Continued)

(52) U.S. Cl.
CPC .......... *H04W 72/042* (2013.01); *H04W 28/18* (2013.01); *H04W 76/27* (2018.02); *H04W 88/02* (2013.01); *H04W 88/08* (2013.01)

(58) Field of Classification Search
None
See application file for complete search history.

(56) References Cited

U.S. PATENT DOCUMENTS 8,301,141 B1  10/2012  Reeves et al.
8,908,582 B2  12/2014  Damnjanovic et al.
(Continued)

FOREIGN PATENT DOCUMENTS

CN    1984466 A    6/2007
CN  102300307 A   12/2011
(Continued)

OTHER PUBLICATIONS

International Search Report and the Written Opinion of the International Searching Authority dated Jun. 24, 2014, in International Application No. PCT/SE2014/050010, 18 pages.
(Continued)

*Primary Examiner* — Anh Ngoc M Nguyen
(74) *Attorney, Agent, or Firm* — Rothwell, Figg, Ernst & Manbeck, P.C.

(57) ABSTRACT

A first one of a wireless communication device (22) and a base station (20) performs a method for applying a change to a configuration or state of a radio bearer. The radio bearer supports the transfer of data over a radio connection between the wireless communication device (22) and the base station (20) with defined data transfer characteristics. The method includes performing a handshake with a second one of the wireless communication device (22) and the base station (20) to agree on a time to synchronously apply the change at the wireless communication device (22) and the base station (20). The method also includes, in accordance with the agreement, synchronously applying the change at that time.

32 Claims, 11 Drawing Sheets

Related U.S. Application Data

(60) Provisional application No. 61/758,622, filed on Jan. 30, 2013.

(51) Int. Cl.
*H04W 76/27* (2018.01)
*H04W 88/02* (2009.01)
*H04W 88/08* (2009.01)

(56) References Cited

U.S. PATENT DOCUMENTS

| | | | |
|---|---|---|---|
| 9,078,264 B2 | 7/2015 | Han et al. | |
| 2006/0056344 A1* | 3/2006 | Roy | H04W 36/06 370/329 |
| 2006/0229102 A1* | 10/2006 | Kitazoe | H04W 72/042 455/560 |
| 2009/0168706 A1* | 7/2009 | Avonts | H04W 16/30 370/329 |
| 2009/0268707 A1 | 10/2009 | Pani et al. | |
| 2010/0034083 A1 | 2/2010 | Prakash et al. | |
| 2010/0103833 A1* | 4/2010 | Englund | H04L 1/0026 370/252 |
| 2010/0111069 A1 | 5/2010 | Torsner et al. | |
| 2011/0199921 A1 | 8/2011 | Damnjanovic et al. | |
| 2011/0312331 A1* | 12/2011 | Hakola | H04W 72/085 455/452.2 |
| 2012/0108199 A1* | 5/2012 | Wang | H04W 76/10 455/405 |
| 2012/0176923 A1 | 7/2012 | Hsu et al. | |
| 2013/0003533 A1 | 1/2013 | Barbieri et al. | |
| 2013/0114457 A1 | 5/2013 | Han et al. | |
| 2013/0121167 A1 | 5/2013 | Wong et al. | |

FOREIGN PATENT DOCUMENTS

| | | |
|---|---|---|
| CN | 102379145 A | 3/2012 |
| EP | 1755355 A1 | 2/2007 |
| EP | 2018072 A1 | 1/2009 |
| RU | 2370894 C2 | 10/2009 |
| RU | 2404524 C2 | 11/2010 |
| WO | 199939528 A1 | 8/1999 |
| WO | 2005117297 A1 | 12/2005 |
| WO | 2007078156 A2 | 7/2007 |

OTHER PUBLICATIONS

3GPF TS 25.321 V11.5.0 (Dec. 2013), 3rd Generation Partnership Project; Technical Specification Group Radio Access Network; Medium Access Control (MAC) protocol specification (Release 11), 207 pages.

Written Opinion of the International Preliminary Examining Authority dated Mar. 6, 2015, in International Application No. PCT/SE2014/050010, 5 pages.

Search Report dated May 10, 2016, in connection with Russian Patent Application No. 2015136482/07(055870), 2 pages.

U.S. Office Action dated Dec. 1, 2015, issued in parent U.S. Appl. No. 14/238,909, 18 pages.

U.S. Final Office Action dated May 16, 2016, issued in parent U.S. Appl. No. 14/238,909, 17 pages.

U.S. Notice of Allowance dated Aug. 18, 2016, issued in parent U.S. Appl. No. 14/238,909, 8 pages.

Chinese Office Action dated Mar. 23, 2018, issued in Chinese Patent Application No. 20140006850.0, 5 pages.

\* cited by examiner

CHANGING RADIO BEARER CONFIGURATION OR STATE

CROSS REFERENCE TO RELATED APPLICATIONS

This application is a continuation of application Ser. No. 14/238,909, filed Feb. 14, 2014 (published as US 20150181640), which is a 35 U.S.C. § 371 National Phase Entry Application from PCT/SE2014/050010, filed Jan. 7, 2014, designating the United States, and also claims the benefit of U.S. Provisional Application No. 61/758,622, filed Jan. 30, 2013. The disclosures of these applications are incorporated herein in their entirety by reference.

TECHNICAL FIELD

The present application generally relates to a radio bearer and specifically relates to applying a change to the configuration or state of the radio bearer at a wireless communication device and a base station.

BACKGROUND

Many wireless communication systems now support multiple kinds of services, including for instance circuit switched voice services, packet data services, high data rate services, etc. These different services have very different characteristics. Moreover, different applications using the same general service may nonetheless impose different demands on that service. For instance, an internet browsing application may be supported by a packet data service that has a variable delay and throughput, while a multimedia streaming application may be supported by a packet data service having a relatively constant average throughput and low delay.

A wireless communication system supports these varying services through the use of radio bearers. A radio bearer supports the transfer of data, e.g., user data, over a radio connection between a wireless communication device and a base station with defined data transfer characteristics (e.g., with a defined quality of service, QoS). Different radio bearers are configured to provide different defined transfer characteristics.

Under some circumstances, though, the configuration or state of a given radio bearer may need to be changed, e.g., in order to optimize the radio bearer for the current requirements of the wireless communication device. A change in the configuration or state of a radio bearer involves, as non-limiting examples in a context where the system is a High Speed Packet Access (HSPA) system, adding or removing the radio bearer, moving the radio bearer between a dedicated physical channel (DPCH) and enhanced uplink (EUL)/high speed (HS), changing the spreading factor and/or bit rate, and/or adding or removing connection capabilities (e.g., EUL 2 ms/10 ms TTI, Dual Cell or multi-carrier, 64QAM, MIMO, CPC, DL enhanced L2, UL improved L2).

Consider the specific example of a radio bearer configuration change relating to a change in the transmission time interval (TTI) of a radio bearer. The TTI is a radio bearer parameter that defines the interval of time in which a transmission occurs over the air interface. In some systems, for instance, a set of one or more so-called transport blocks are fed from a medium access control (MAC) layer to the physical layer, and the TTI is the time it takes to transmit that set of one or more transport blocks over the air interface. Regardless, a longer TTI (e.g., 10 ms or above) proves more robust in the face of poor channel conditions. On the other hand, a shorter TTI (e.g., 2 ms) reduces latency, which is required to provide good end-user experience when supporting mobile broadband services. Because of this, it is desirable to use a shorter TTI over as wide an area as possible. However, at least in current 3G networks, a substantial number of large macro cells still exist. With a macro cell being so large, it generally proves challenging for the cell to support a TTI as short as 2 ms over its entire coverage area. In such environments, it may be necessary to fall back to a longer TTI, e.g., 10 ms, when a wireless communication device approaches the cell boundary. This however requires that a radio bearer configuration change be triggered when the device approaches the cell boundary, and that the change be applied.

Regardless of the particular type of radio bearer configuration or state change, triggering and applying this change at an optimal time proves important for ensuring high system performance. In order to trigger and apply a radio bearer configuration change at the optimal time, the criteria used to trigger the change should be accurate and the procedure used to actually apply the change should be fast and robust.

With regard to the criteria used to trigger the change, at least some radio bearer configuration changes (like the TTI switch described above) are triggered depending on the uplink coverage of a wireless communication device. Known approaches measure this coverage as a function of how long the device operates at maximum output power. When the device operates at maximum output power for a certain amount of time (the time-to-trigger, TTT), an event (e.g., Event 6d in HSPA EUL) is triggered. This TTT is configured by a node in the network, e.g., a radio network controller (RNC). When the RNC receives this event from the device, it considers the device to be running out of coverage and triggers a radio bearer configuration change.

With regard to the procedure used to implement a radio bearer state or configuration change, different procedures can be used depending on whether the source and target configuration/state are compatible. If they are compatible, then both the device and base station may be able to apply the change at different times (i.e., non-synchronously) without the radio connection failing. On the other hand, if they are not compatible, then the device and base station should apply the change at the same time (i.e., synchronously) in order for the radio connection to survive.

In known approaches to synchronous application of a radio bearer state or configuration change, a higher-layer (e.g., a Radio Resource Control, RRC, layer or layer 3) centrally coordinates application of the change to occur synchronously at the wireless communication device and base station. A higher-layer message, for instance, is sent from a radio network controller (RNC) to both the device and base station ordering the change and specifying a future point in time (called "activation time") at which the change is to be applied synchronously. This activation time is defined by a connection frame number (CFN). The CFN is a counter 0...255 (known by RNC, base station and device) which is stepped every radio frame (every 10 milliseconds) and thus has a wrap around every 2.56 seconds (256*10 ms). The RNC will decide on how far ahead the activation time shall be set based on the expected time to forward the change order message to the device and the base station. Typically the time to forward the order message via the air interface to the device is the limiting factor. Indeed, due to occasional loss of this message and its acknowledgement, the activation time must be set conservatively (i.e., longer) to allow for several retransmissions. That said, the range of the CFN dictates that the RNC cannot set the activation time to be more than 2.56 seconds (minus some margin) ahead. If this time is not enough to successfully forward the order to the device, the change will typically fail and the call is dropped.

SUMMARY

One or more embodiments herein improve the triggering and/or applying of a change to a configuration or state of a radio bearer, such as a change in the length of a TTI of the radio bearer, as compared to known approaches.

More particularly, embodiments herein include a method for applying a change to a configuration or state of a radio bearer. The radio bearer supports the transfer of data over a radio connection between a wireless communication device and a base station with defined data transfer characteristics. The method is performed by a first one of the device and the base station. The method entails performing a handshake with a second one of the wireless communication device and the base station to agree on a time to synchronously apply the change at the wireless communication device and the base station. The method then includes, in accordance with the agreement, synchronously applying the change at that time.

Performing this handshake advantageously obviates the need for an RNC to centrally coordinate synchronous application of the change (e.g., at a relatively high layer, such as the RRC layer). Having the device and base station perform this handshake thereby enables a faster and more robust procedure for change application than having an RNC centrally coordinate change application.

In any event, the handshake in some embodiments includes the wireless communication device sending a ready signal to the base station indicating to the base station that the wireless communication device is ready to apply said change. Additionally or alternatively, the handshake includes the base station sending the device a signal ordering the device to perform the change. Regardless of the particular types of signals exchanged, in some embodiments, the specific time at which the device and the base station agree to synchronously apply the change is relative to a time at which a signal utilized for the handshake is transmitted or received.

In some embodiments, the ready signal described above comprises an out-of-band control signal transmitted without an accompanying data channel. This out-of-band control signal is nominally configured to indicate one or more characteristics associated with such an accompanying data channel but indicates one or more characteristics that are not expected to be or that cannot be associated with any accompanying data channel. For example, in one embodiment, the out-of-band control signal indicates a transport format combination that is not expected to be or that cannot be a transport format combination for any accompanying data channel.

Alternatively or additionally, the order signal described above comprises a High Speed Downlink Shared Channel, HS-DSCH, Shared Control Channel, HS-SCCH, order (or simply "HS Order" for short).

In at least some embodiments, performing the handshake comprises initiating the handshake responsive to receiving a change command from a radio network controller directing that the change be applied as soon as possible and that the handshake be initiated. In this case, though, the change command does not indicate a specific time for application of the change. Corresponding processing by the radio network controller thereby includes generating the change command and transmitting the change command towards at least one of the device and the base station.

Alternatively, performing the handshake comprises determining to initiate the handshake in response to determining that a set of one or more criteria has been met pertaining to one or more metrics computed by the wireless communication device. For example, the one or more metrics in some embodiments include a power headroom metric that indicates an amount of power available at the wireless communication device for transmitting data to the base station. In this case, processing herein includes evaluating whether the power headroom metric has fallen below a defined threshold for at least a defined length of time. If so, it is determined to initiate the handshake.

Other embodiments herein correspondingly improve the triggering of a radio bearer configuration or state change when that triggering is based on a wireless communication device's uplink coverage. These embodiments more specifically improve a device's uplink coverage triggering of such a change, by broadly basing triggering on the device's power headroom, e.g., rather than on event 6d.

For example, embodiments herein include a method implemented by a wireless communication device for changing a configuration or state of a radio bearer. The method includes computing a power headroom metric indicating an amount of power available at the wireless communication device for transmitting data to the base station. The method also includes, responsive to the power headroom metric falling below a defined threshold for at least a defined length of time, autonomously initiating a change of the configuration or state of the radio bearer. This method in some embodiments is performed without the handshake described above being implemented, but in other embodiments is performed in order to trigger that handshake.

In some embodiments, initiating the change in the method therefore includes generating a power headroom report from the power headroom metric and transmitting that report to a network node that is configured to order the change responsive to that report. This power headroom report reflects a coverage measurement rather than a scheduling criteria.

In one or more embodiments, computing the metric comprises performing instantaneous measurements of a power headroom of the wireless communication device indicating an amount of power instantaneously available at the device for transmitting data to the base station. Computation then includes computing the power headroom metric by filtering the instantaneous measurements in accordance with an exponential filter defined by a specific filter constant.

Embodiments herein also include corresponding apparatus configured to perform the processing above.

Of course, the present invention is not limited to the features, advantages, and contexts summarized above, and those familiar with the wireless communication technology will recognize additional features and advantages upon reading the following detailed description and upon viewing the accompanying drawings.

DETAILED DESCRIPTION

Figure 1:
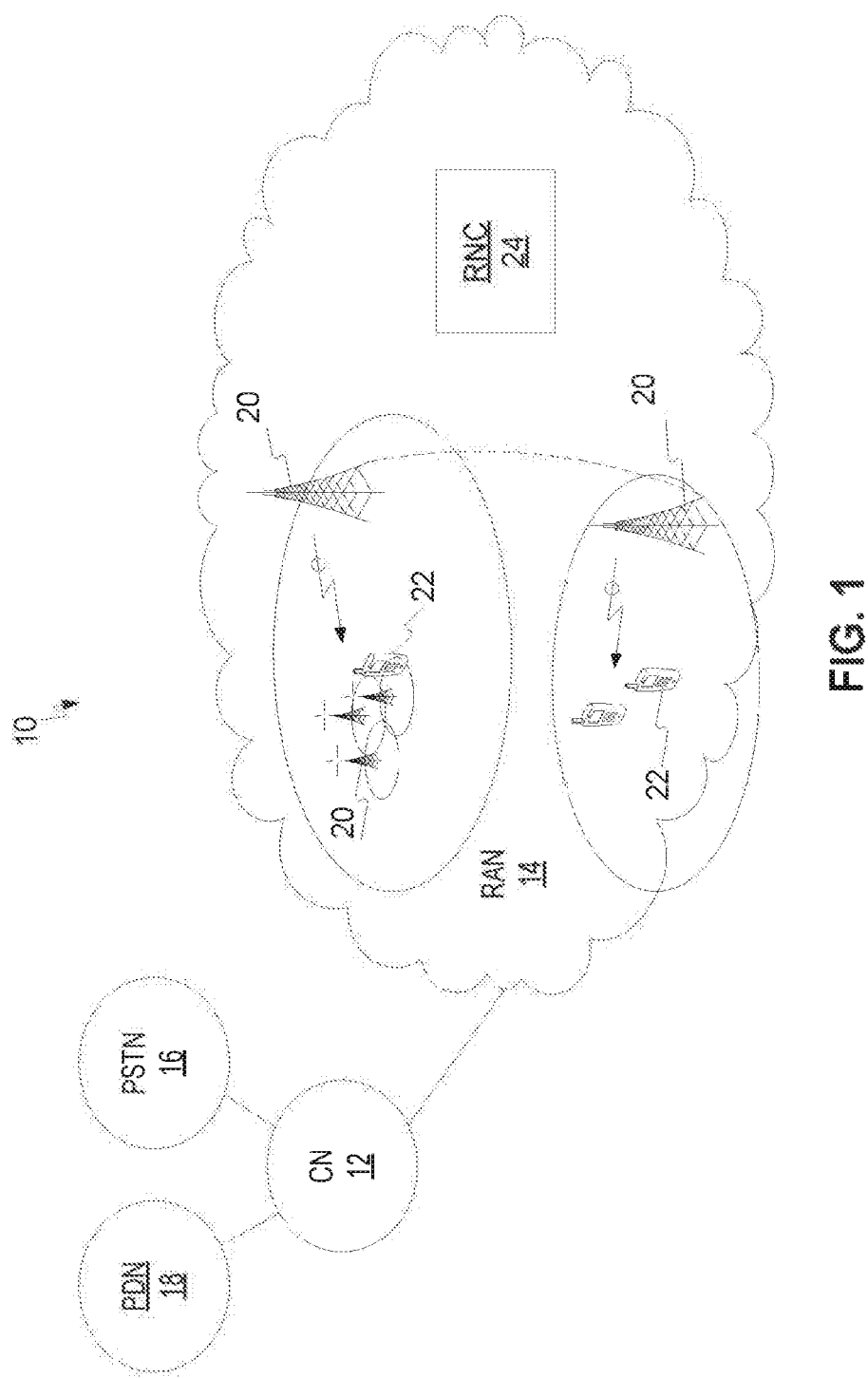
FIG. 1 is a block diagram of a wireless communication system that includes a wireless communication device, a base station, and a radio network controller configured according to one or more embodiments herein.

FIG. 1 illustrates a wireless communication system 10 according to one or more embodiments. As shown, the system 10 includes a core network (CN) 12 and a radio access network (RAN) 14. The CN 12 communicatively couples the RAN 14 to one or more external networks, such as a public switched telephone network (PSTN) 16, a packet data network (PDN) 18 such as the Internet, or the like. The RAN 14 includes one or more base stations 20 configured to wirelessly communicate with one or more wireless communication devices 22 (e.g., user equipment, UE, or machine-to-machine devices) (also referred to herein as simply "devices"). In at least some embodiments, the RAN 14 further includes one or more radio network controllers (RNC) 24. The RAN 14 in some embodiments includes different types of radio access network deployments, such as macro access point deployments and pico access point deployments, each of which is controlled by a base station as used herein.

The system 10 illustrated in FIG. 1 supports different services through the use of radio bearers. A radio bearer supports the transfer of data, e.g., user data, over a radio connection between a wireless communication device 22 and a base station 20 with defined data transfer characteristics (e.g., with a defined quality of service, QoS). A change in the configuration or state of a radio bearer (generally referred to herein as simply "the change") involves, as non-limiting examples in a context where the system is a High Speed Packet Access (HSPA) system, adding or removing the radio bearer, moving the radio bearer between a dedicated physical channel (DPCH) and enhanced uplink (EUL)/high speed (HS), changing the spreading factor and/or bit rate, and/or adding or removing connection capabilities (e.g., EUL 2 ms/10 ms TTI, Dual Cell or multi-carrier, 64QAM, MIMO, CPC, DL enhanced L2, UL improved L2).

One or more embodiments herein improve the triggering and/or applying of a change to a configuration or state of a radio bearer, such as a change in TTI.

Figure 2:
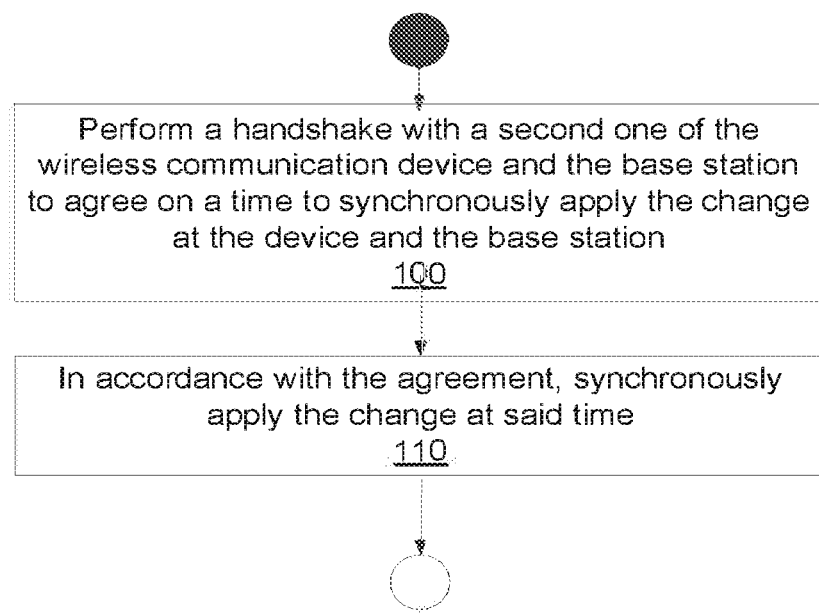
FIG. 2 is a logic flow diagram of a method performed by a first one of the wireless communication device and the base station for applying a change to a configuration or state of a radio bearer, according to one or more embodiments.

FIG. 2 illustrates one or more embodiments of a method performed by a first one of a wireless communication device 22 and a base station 20 in this regard. The method is performed for applying a change to a configuration or state of a radio bearer. The method comprises performing a handshake with a second one of the device 22 and the base station 20 to agree on a time to synchronously apply the change at the device 22 and the base station 20 (e.g., at some time after both the device 22 and base station 20 are ready to apply the change) (Block 100). The method then comprises, in accordance with the agreement, synchronously applying the change at that time (Block 110).

Notably, performing the handshake as shown in FIG. 2 obviates the need for some other node (e.g., the RNC 24) to centrally coordinate the time at which the change is to be synchronously applied. That is, the handshake as used herein means a two-party handshake whereby the device 22 and base station 20 as the two parties to the handshake exchange information in order to autonomously agree on the time to synchronously apply the change, without some other node dictating that time in a central manner as is conventional. Such exchange of information may be performed in any manner, including for example in the form of an order from one party to the handshake (whereby the order either commands or requests the change) and a resulting confirmation or acknowledgement of the order from the other party to the handshake. Regardless, as compared to this conventional approach, having the device 22 and the base station 20 perform the handshake enables a faster and more robust procedure for change application, especially when the source and target configuration/state are incompatible.

For example, when the bearer configuration or status change entails a switch from a shorter transmission time interval (TTI) to a longer TTI upon nearing a cell boundary, the switch to the longer TTI in some embodiments is delayed longer than in conventional approaches. This is because conventional approaches must conservatively set the activation time for the switch, as described above. Delaying the switch to the longer TTI avoids underutilizing the shorter TTI when channel conditions would otherwise allow use of such shorter TTI to reduce latency.

In one or more embodiments, the device 22 and the base station 20 exchange one or more signals as part of the handshake. In one embodiment, for example, the handshake includes the device 22 sending a signal to the base station 20 indicating to the base station 20 that the device 22 is ready to apply the change. Additionally or alternatively, the handshake includes the base station 20 sending the device 22 a signal ordering the device 22 to perform the change. Regardless of the particular types of signals exchanged, in some embodiments, the specific time at which the device 22 and the base station 20 agree to synchronously apply the change is relative to a time at which a signal utilized for the handshake is transmitted or received.

Figure 3A:
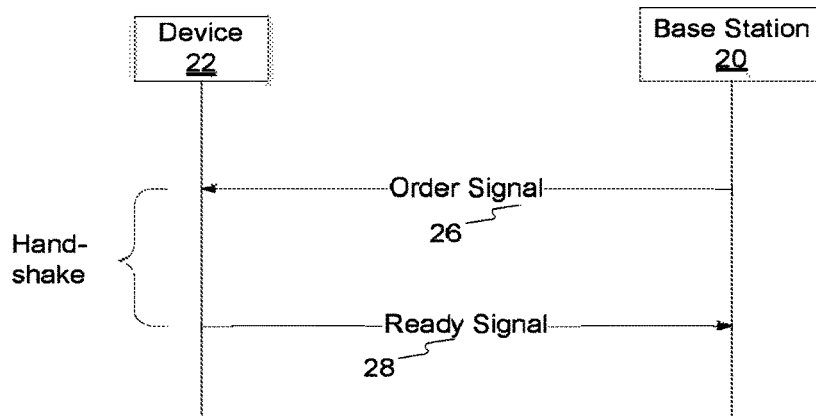
FIGS. 3A-3C are signaling diagrams illustrating alternative embodiments for performing a handshake between a wireless communication device and a base station.

Consider, for example, the embodiment shown in FIG. 3A. As shown, the base station 20 initiates the handshake with the device 22 by sending the device 22 an order signal 26 ordering (i.e., commanding or requesting) the device 22 to perform the change. The order signal 26 in this embodiment implicitly indicates to the device 22 that the base station 20 is ready to perform the change, i.e., at a time when the device 22 is also ready. Responsive to the order signal 26, and upon the device 22 itself being ready to apply the change, the device 22 sends the base station 20 a ready signal 28 indicating to the base station 20 that the device 22 is also ready to apply the change. This ready signal 28 thereby effectively confirms or acknowledges the order signal 26 from the base station 20. Both the device 22 and base station 20 are configured to understand that this ready signal 28 concludes the handshake and thereby formalizes agreement between the device 22 and base station 20 on when to apply the change. That is, the device 22 determines that such an agreement has been made responsive to sending the ready signal 28 and the base station 20 determines that such an agreement has been made responsive to receiving the ready signal 28. The device 22 and base station 20 agree to apply the change at a defined time after both the device 22 and base station 20 have indicated readiness for change application, e.g., at a specific time defined relative to when the ready signal 28 is transmitted by the device 22 or received by the base station 20. For example, this specific, "agreed-upon" time in one or more embodiments is defined to be the time at which the next transmission time interval (TTI) starts after the ready signal 28 is transmitted or received. Where different TTI configurations exist (e.g., 2 ms or 10 ms), this next TTI is defined with respect to a certain TTI configuration (e.g., 10 ms).

Figure 3B:
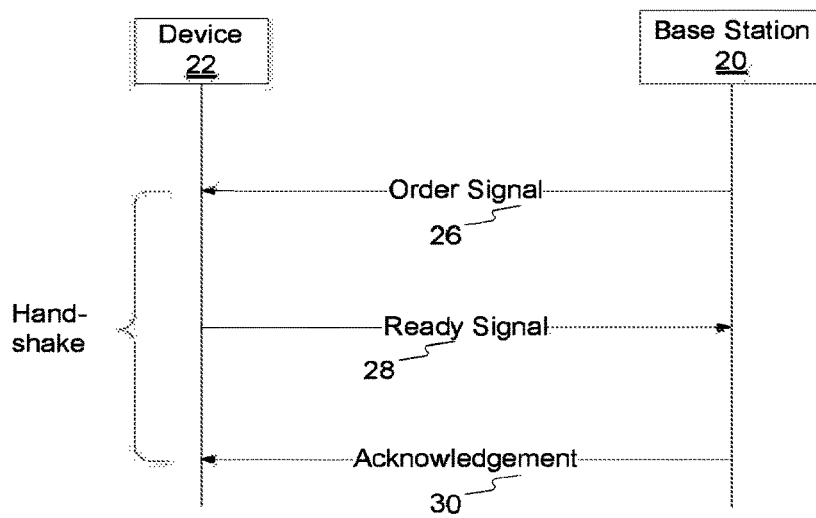

FIG. 3B shows another embodiment that extends the handshake of FIG. 3A to include the base station 20 sending an acknowledgement signal 30 to the device 22. The acknowledgement signal 30 acknowledges the base station's receipt of the ready signal 28. In this embodiment, the device 22 and base station 20 are configured to understand that the acknowledgement signal 30, not the ready signal 28, formalizes the agreement on when to apply the change. The device 22 therefore refrains from applying the change unless and until it receives the acknowledgement signal 30. This protects the device 22 from improperly applying the change in the scenario where poor uplink channel conditions prevent the base station 20 from receiving the device's ready signal and correspondingly applying the change. The device 22 is configured to re-transmit the ready signal 28 if it has not received the acknowledgement signal 30 within a predefined length of time since sending the ready signal 28. This inherently means that the agreed-upon time for synchronous change application is defined relative to when the acknowledgement signal 30 is transmitted by the base station 20 or received by the device 22.

Figure 3C:
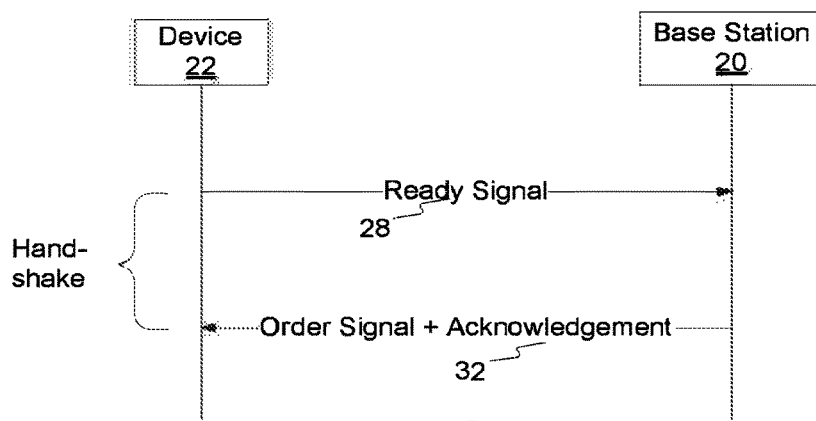

As yet another example, consider the embodiment shown in FIG. 3C. As shown, the device 22 initiates the handshake with the base station 20 by sending the ready signal 28 to the base station 20 indicating to the base station 20 that the change criteria are met and the device 22 is ready to apply the change. In some sense, then, this ready signal 28 effectively requests the change. Regardless, responsive to the ready signal 28, and of course upon the base station 20 itself being ready to apply the change, the base station 20 sends the device 22 an order signal 32, ordering (i.e., commanding or requesting) the device 22 to perform the change. The order signal 32 also in this embodiment implicitly indicates to the device 22 that the base station 20 is ready to perform the change. Moreover, since the base station 20 sends the order signal 32 responsive to receipt of the ready signal 28, the order signal 32 implicitly acknowledges the base station's receipt of the ready signal 28 and thereby confirms the device's effective request for the change. Both the device 22 and base station 20 are configured to understand that this order signal 32 formalizes agreement between the device 22 and base station 20 to apply the change at a defined time after both the device 22 and base station 20 have indicated readiness for change application, e.g., at a specific time defined relative to when the order signal 32 is transmitted by the base station 20 or received by the device 22.

No particular format or structure is required for signals utilized in the handshake. However, in at least some embodiments, one or more of the utilized signals are formatted or structured in a particular way in order to facilitate the robustness of the signal(s) against transmission errors. Facilitating the robustness of the signal(s) translates into fast change application, because the device 22 and base station 20 can aggressively agree on a specific time that occurs soon.

In one or more embodiments, for example, the ready signal 28 comprises an out-of-band control signal that is transmitted without an accompanying data channel, so as to be a "stand-alone" out-of-band control signal. The out-of-band control signal is nominally configured to indicate one or more characteristics associated with such an accompanying data channel (e.g., so as to describe what is being transmitted on the data channel). This means that when the out-of-band control signal is transmitted with an accompanying data channel, the control signal serves its nominal function of indicating the one or more characteristics associated with the data channel (and does not serve as the ready signal 28). By contrast, when the out-of-band control signal is transmitted without an accompanying data channel, the control signal necessarily cannot serve its nominal function anymore and instead serves as the ready signal 28. Even though not serving its nominal function, the out-of-band control signal may nonetheless be formatted or structured as if serving its nominal function. Because of the nominal importance of the out-of-band control signal, e.g., for decoding the data on the data channel, the out-of-band control signal is already robust in and of itself for guarding against transmission errors. In one or more embodiments where the system is an HSPA system, for instance, the ready signal 28 is realized as an enhanced dedicated physical control channel (E-DPCCH) that is transmitted without an accompanying enhanced dedicated physical data channel (E-DPDCH).

Additionally or alternatively to realizing the ready signal 28 as a stand-alone out-of-band control signal, the ready signal 28 in one or more embodiments is realized as an out-of-band control signal that is transmitted over a predefined number of TTIs greater than one. Transmitting the out-of-band control signal over multiple TTIs in this way advantageously increases the robustness and thereby the reliability of the ready signal 28.

As yet another way to increase the robustness of the ready signal 28, the ready signal 28 in one or more additional or alternative embodiments is realized as an out-of-band control signal that indicates one or more characteristics that are not expected to be or that cannot be associated with any accompanying data channel. For example, the ready signal 28 in some embodiments is realized as an out-of-band control signal that indicates a transport format combination (TFC) that is not expected to be or that cannot be a TFC for any accompanying data channel. In one or more embodiments where the system is an HSPA system, for instance, the ready signal 28 is realized as an E-DPCCH that indicates an Enhanced Dedicated Channel (E-DCH) TFC that is not expected to be or that cannot be associated with an E-DPDCH. The E-DPCCH may indicate such E-DCH TFC with a special value for the E-TFCI field (7 bits). For instance, in the E-TFCI Table 0 for the 2 ms TTI as specified in 3GPP TS 25.321, Annex B, the E-TFCI 120 is labeled as N/A, meaning that this value cannot be associated with an accompanying E-DPDCH and therefore may be used for realizing the ready signal 28. Alternatively, the ready signal 28 may be realized using the highest E-TFCI value (corresponding to the highest data rate) that can be associated with an accompanying E-DPDCH but that is not expected to be so associated given the current network load, the current radio capability, or the current radio environment.

In other embodiments, the ready signal 28 comprises a particular in-band control signal. In one or more embodiments where the system is an HSPA system, for instance, the ready signal 28 may be realized as an "extended" scheduling indicator (SI) (e.g., an 18 bit Protocol Data Unit, PDU) or other small message on the E-DPDCH. Regardless, in some embodiments, this in-band control signal is transmitted only very occasionally and is correspondingly over-dimensioned in transmit power in order to increase its robustness.

Additionally or alternatively, the order signal 26, acknowledgement signal 30, and/or the order signal plus acknowledgement signal 32 in FIGS. 3A-3C are realized as a High Speed Shared Control Channel (HS-SCCH) order in one or more embodiments.

Figure 4A:
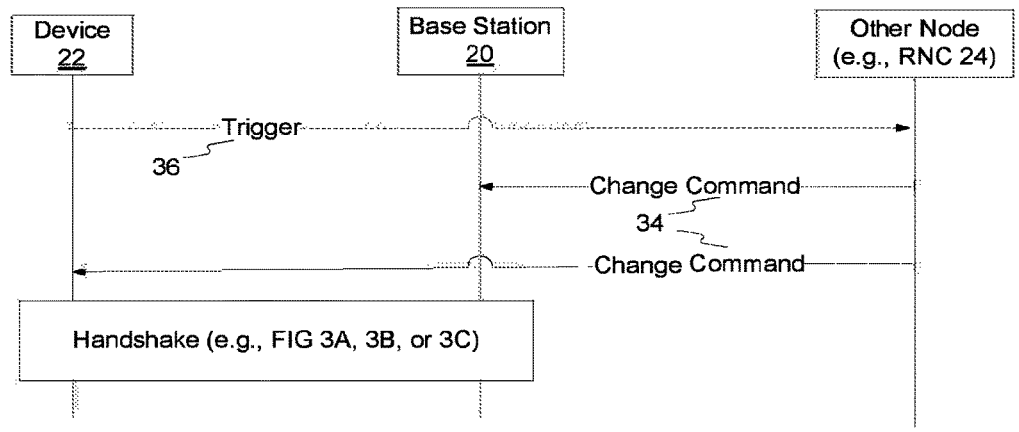
FIGS. 4A-4C are signaling diagrams illustrating alternative embodiments for triggering and/or initiating a handshake between a wireless communication device and a base station.
Figure 4B:
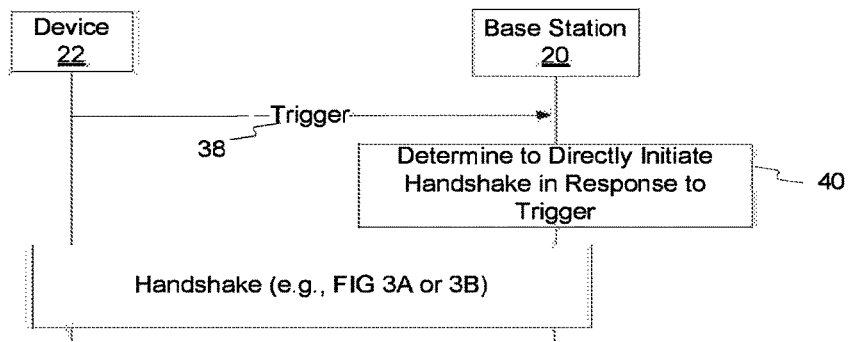
Figure 4C:
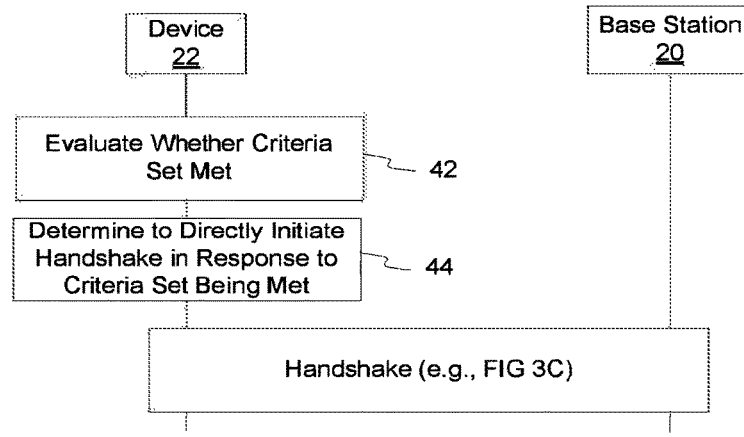

Regardless of the particular details about how to realize signals utilized for the handshake, the handshake may be triggered and/or initiated in any number of ways. FIGS. 4A-4C illustrate a few examples in this regard.

As shown in the embodiment of FIG. 4A, for instance, either the device 22 or base station 20 directly initiates the handshake (e.g., of FIG. 3A, 3B, or 3C) responsive to receiving a change command 34 from another node (e.g., RNC 24). This change command 34 directs that the change is to be applied as soon as possible and that the handshake is to be initiated. Notably, the change command 34 directs this without indicating a specific time that the change is to be applied. That is, the change command 34 instead just orders the change to be performed, without dictating the exact time of change application.

Figure 5:
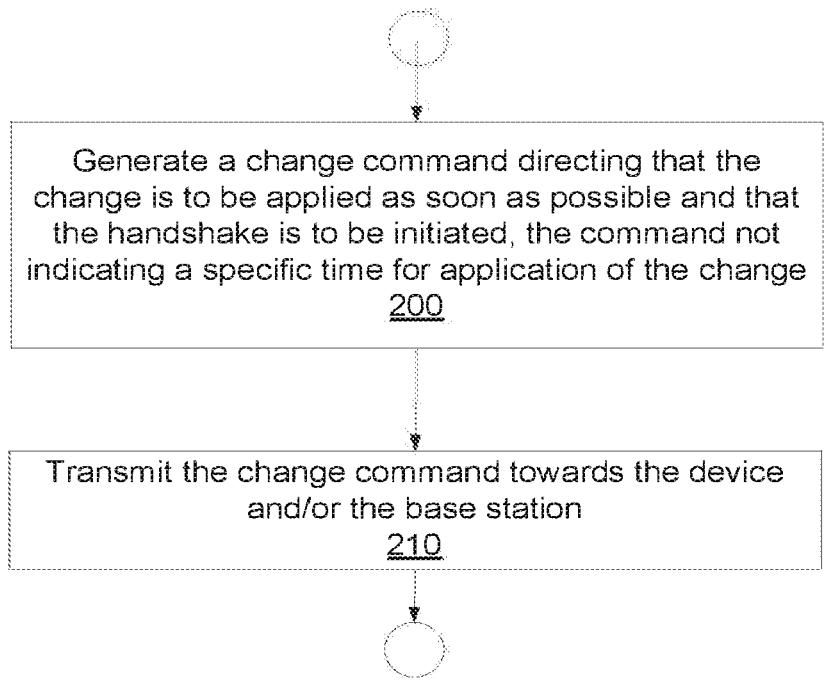
FIG. 5 is a logic flow diagram of a method performed by a radio network controller for changing a configuration or state of a radio bearer, according to one or more embodiments herein.

Referring briefly to FIG. 5, processing by the other node (e.g., RNC 24) correspondingly includes generating the change command 34 directing that the change to the configuration or state of the radio bearer is to be applied as soon as possible and that the handshake between the device 22 and the base station 20 (to agree on a time to synchronously apply the change) is to be initiated (Block 200). Again, the change command 34 does not indicate a specific time for application of the change. Processing then further includes transmitting the change command towards at least one of the device 22 and the base station 20 (Block 210).

In one or more embodiments, this change command 34 comprises a higher-layer message (e.g., a Radio Resource Control Radio Bearer Reconfiguration message) directing that the configuration or status of the radio bearer be changed. In doing so, the higher-layer message directs the change to be applied and directs the handshake to be initiated in order for the specific time for such application to be decided. In at least some sense, then, the higher-layer message indicates that application of the change is to be non-synchronized from a higher-layer (e.g., RNC or layer 3) perspective, but that such application is indeed to be synchronized from a lower-layer perspective.

In at least some embodiments, the other node (e.g., RNC 24) in FIG. 4A transmits the change command 34 responsive to a trigger 36 from the device 22. FIG. 4B illustrates an alternative embodiment. As shown in this alternative, the device 22 transmits a trigger 38 to the base station 20 rather than the other node (e.g., RNC 24). Responsive to this trigger, the base station 20 determines to directly initiate the handshake (Block 40). Upon such determination, for example, the base station 20 initiates the handshake of FIG. 3A or 3B, by sending the order signal 26 to the device 22.

In some embodiments, the trigger 36, 38 in FIG. 4A or 4B is a signal that the device 22 transmits indicating the occurrence of a particular event. For example, in HSPA EUL embodiments, such an event may be Event 6d, which is an event indicating that the device 22 has operated at maximum output power for a certain amount of time (the time-to-trigger TTT) and thereby serves as a coverage measurement for the device 22. However, the use of Event 6d does not allow for coverage gains achieved using multiple Hybrid automatic repeat request (HARQ) retransmissions. HARQ retransmission is a very powerful tool for extending coverage by combining multiple transmissions of the same data before decoding. If the device 22 is not moving very fast, Event 6d is triggered as soon as the device 22 is transmitting at maximum power, not giving HARQ retransmission the chance to work. On the other hand, a fairly long time-to-trigger (TTT) is needed for Event 6d to avoid switching even earlier due to fast fading. For a fast moving device 22, there is a problem with a long TTT in that the coverage may deteriorate so quickly that by the time Event 6d is triggered, the device 22 may no longer be able to reach the base station 20.

In one or more alternative embodiments, therefore, the trigger 36, 38 in FIG. 4A or 4B is a signal that the device transmits 22 indicating that a set of one or more criteria has been met pertaining to one or more metrics computed by the device 22. More particularly in this regard, the device 22 evaluates whether this set of one or more criteria has been met. In response to determining that the set has been met, the device determines to indirectly initiate the change (and thereby the handshake). In the embodiments of FIGS. 4A and 4B, the device 22 indirectly initiates the change (and thereby the handshake) by transmitting the trigger 36, 38 to a network node (e.g., the base station 20 or RNC 24) that will cause the network node to order the change (as in FIG. 4A) or directly initiate the handshake (as in FIG. 4B).

FIG. 4C illustrates yet another alternative embodiment where the device 22 directly initiates the change (and thereby the handshake), rather than only indirectly initiating by transmitting the trigger 36, 38. Specifically, the device 22 evaluates whether the set of one or more criteria has been met (Block 42), as described above. In response to determining that the criteria set has been met, the device 22 itself determines to directly initiate the handshake (Block 44), without transmitting any sort of trigger to another node that is configured to initiate the handshake responsive to that trigger. Upon such determination, for example, the device 22 initiates the handshake of FIG. 3C, by sending the ready signal 28 to the base station 20.

Figure 6:
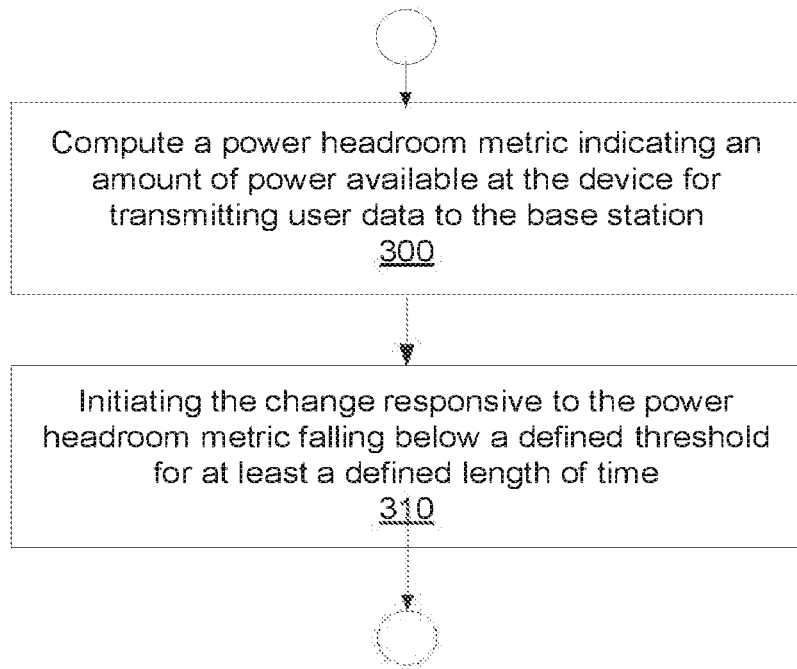
FIG. 6 is a logic flow diagram of a method performed by a wireless communication device for changing a configuration or state of a radio bearer, according to one or more embodiments herein.

In at least some embodiments, the device determines to indirectly initiate the change (e.g., in FIG. 4A or 4B) or to directly initiate the change (e.g., in FIG. 4C) based on the device's power headroom rather than on Event 6d. That is, the one or more metrics computed by the device 22 as described above pertains to the device's power headroom. Basing initiation of the change on power headroom advantageously resolves the above problems demonstrated with respect to Event 6d. One example is the detection of coverage limitation when the device is not transmitting any data. When the physical control channels alone are consuming 99% of the device's transmission power, there is not enough power remaining for transmitting any traffic even though Event 6d is not yet triggered. If, all of a sudden, the device is in need of a handover, the required RRC signaling would not be able to get through to the network and the connection would drop as a result. Another example is the use of HARQ retransmission for extending coverage. It is advantageous for latency purpose to not use any kind of retransmission when the device is not power limited. But, when the device has problems reaching the network with one transmission, multiple transmissions at full power will extend the coverage. If Event 6d is used, it will be triggered too quickly by one transmission at full power, making it impossible to use retransmissions consistently for coverage extension. The use of power headroom does not suffer from this problem. FIG. 6 illustrates processing performed by the device 22 in this regard.

As shown in FIG. 6, processing by the device 22 includes computing a power headroom metric indicating an amount of power available at the device 22 for transmitting data to the base station 20 (Block 300). Processing then entails (directly or indirectly) initiating the change responsive to a set of one or more criteria pertaining to the power headroom metric having been met; namely, the power headroom metric falling below a defined threshold for at least a defined length of time (Block 310). The defined threshold and/or the defined length of time are configured by the network in at least some embodiments. Of course, a hysteresis on the threshold may be defined to improve the stability of change initiation. Regardless, the device 22 detects, monitors, or otherwise determines whether these criteria pertaining to the power headroom metric have been met, in order to autonomously initiate the change when those criteria are met.

As suggested above, initiating the change in FIG. 6 in some embodiments comprises simply generating and transmitting the trigger 36, 38 of FIG. 4A or 4B to a network node (e.g., base station 20 or RNC 24). The trigger 36, 38 in this case is a power headroom report indicating that the power headroom metric has fallen below the defined threshold for at least the defined length of time. Since the network node is configured to order the change or directly initiate the change responsive to that trigger 36, 38, transmitting the trigger 36, 38 in this way amounts to indirectly initiating the change.

In other embodiments, though, the device 22 initiating the change in FIG. 6 comprises directly initiating the change by generating and transmitting the ready signal 28 to the base station 20 (e.g., according to FIG. 4C). That is, rather than the change being triggered by reception of a signal from the base station 20 or RNC 24, the device 22 autonomously and dynamically initiates the change itself. This of course reduces the amount of control signaling between the base station/RNC and device 22, and speeds up the change process.

Irrespective of exactly how the change is initiated in FIG. 6, though, the device 22 in some embodiments is configured to compute the power headroom metric by performing instantaneous measurements (or other primitive measurements that are internal to the device) of the device's power headroom. These instantaneous measurements each indicate an amount of power instantaneously available at the device 22 for transmitting data to the base station 20. For instance, in HSPA embodiments, the instantaneous power headroom measurements each comprise a ratio of the maximum device transmission power to the power of the uplink physical control channel, namely the Dedicated Physical Control Channel (DPCCH). When this ratio is low, the DPCCH is taking up a significant portion of the total power, leaving insufficient power for the transmission of user and control data. Regardless, having performed these instantaneous measurements, the device 22 then computes the power headroom metric by filtering the instantaneous measurements in accordance with a filtering condition, e.g., as supplied by the network. In one embodiment, for example, the device 22 filters the measurements in accordance with an exponential filter defined by a specific filter constant. Such filter constant in some embodiments is supplied by the base station 20 and/or RNC 24.

Note that at least in HSPA EUL embodiments a different type of power headroom metric than that described above may be carried in the scheduling information (SI), which is transmitted in-band on an enhanced dedicated channel (E-DCH). The SI is received and terminated in the base station 20. This different type of power headroom metric may be computed by only filtering a primitive measurement in terms of a 100 ms average, e.g., as opposed to being filtered in accordance with the above-described exponential filter. Moreover, the different type of power headroom metric is reported for scheduling, not for coverage measurement. And, even if the SI were to be configured for periodic reporting, the SI would not be triggered unless the device has data to send. Accordingly, embodiments herein additionally or alternatively report a power headroom metric as described above with respect to FIGS. 4A and 4B for coverage measurement.

Note that embodiments herein also include corresponding processing performed at the base station 20 and/or RNC 24 for processing the power headroom report herein, e.g., in order to implement the radio bearer configuration or state change.

Although the embodiment of FIG. 6 has in large part been described in a context involving the handshake of FIGS. 3A-3B and FIGS. 4A-4C, FIG. 6's processing in some embodiments is performed without any such handshake occurring. For example, FIG. 6's processing in some embodiments simply triggers known approaches to synchronous application of the change, e.g., where the RNC 24 centrally coordinates the timing of change application rather than the device 22 and base station 20 performing the handshake herein Moreover, although the above embodiments have largely been described apart from any particular wireless communication system type or standard, apart from any particular type of radio bearer configuration or state change, and apart from any particular way of defining the time for change application, embodiments below will focus on particular concrete examples as specific contexts for change application. These examples illustrates how the above embodiments may be applied to achieve a robust EUL TTI switch (i.e., a dynamic TTI adaptation) that maximizes utilization of a 2 ms TTI by a device (i.e., UE) 22. In particular, the examples exploit both the improved device-side triggering criteria based on the device's power headroom (UPH) (i.e., as shown in FIG. 6), as well as the faster and more robust switching procedure provided by a handshake. The examples particularly illustrate the physical layer (L1) aspects of the handshake.

Figure 7:
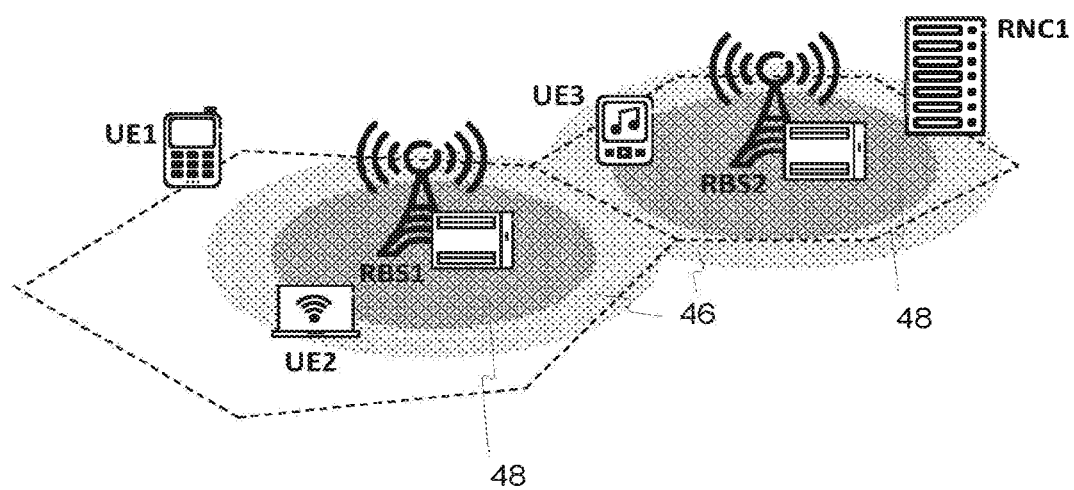
FIG. 7 is a block diagram of a mobile communication network in which a switch between different transmission time intervals (TTIs) is performed, according to one or more embodiments.

To provide context for the examples, FIG. 7 illustrates a mobile communication network in which the examples are applicable. The extent of EUL coverage for a 2 ms TTI is represented in FIG. 7 by the gray area, including both a less densely gray area 46 and a more densely gray area 48. The boundary between the areas 46 and 48 represents the location where a switch from the 2 ms TTI to the 10 ms TTI would be needed with known approaches for a device 22 moving toward the boundary between RBS1's cell and RBS2's cell. Embodiments herein will advantageously be able to push this boundary outwards and reduce area 46 significantly. In fact, with embodiments herein that base triggering of the switch on device power headroom, the switch from the 2 ms TTI to the 10 ms TTI may not be needed (meaning that no handshake is needed in that case).

Figure 8:
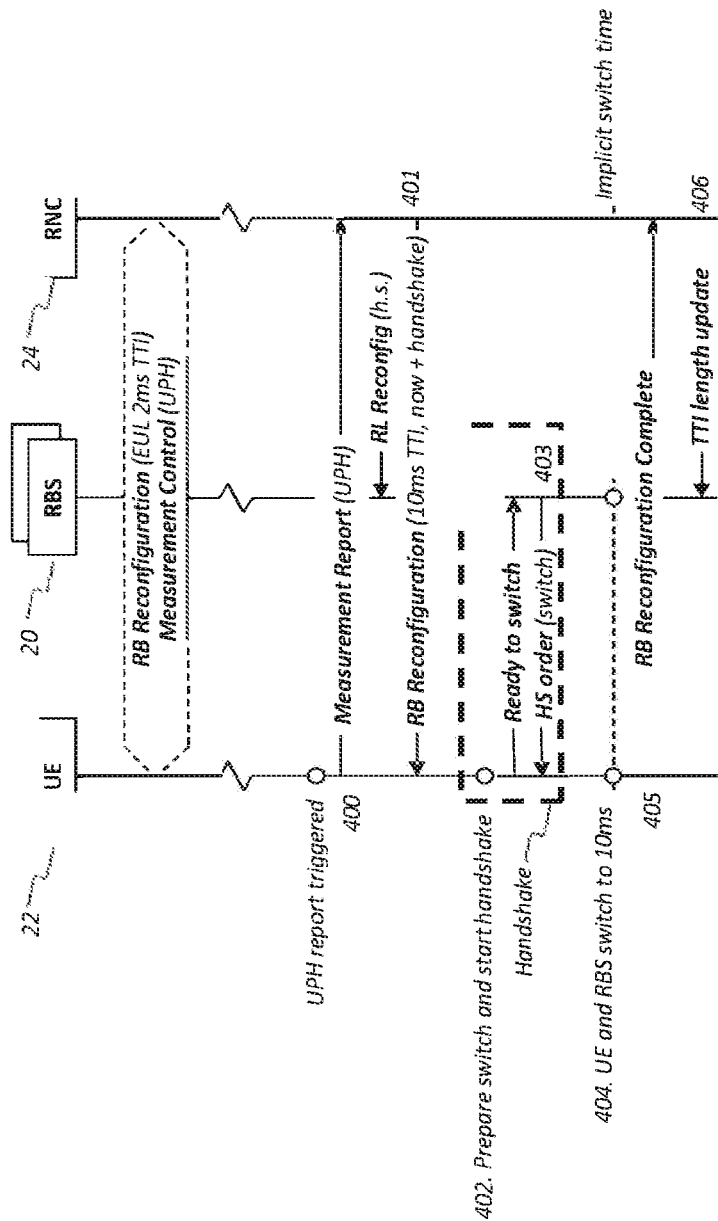
FIG. 8 is a call flow diagram illustrating embodiments from FIGS. 3C and 4A in the context of a TTI switch.

FIG. 8 shows a first example illustrating embodiments from FIGS. 3C and 4A in the context of a TTI switch. As shown in FIG. 8, during radio bearer setup or reconfiguration on EUL with the 2 ms TTI, the UE 22 is configured by an RRC message, namely, a Measurement Control (UPH) message, with the new UPH measurement with reporting criteria as described above. Upon fulfillment of the reporting criteria, the UPH report is triggered, whereupon the UE 22 sends an RRC message, namely a Measurement Report message that includes the UPH report, to the RNC 24 (Step 400). Upon reception of a UPH report, signaling the need of a switch to 10 ms TTI, a conventional unsynchronized switch may be used to speed up the process (since a conservative activation time is not needed). However, the disadvantage of an unsynchronized switch is that the network does not know when the UE 22 will be switching and, as a result, needs to perform blind TTI detection, i.e., to be ready to receive transmissions with either TTI length. To avoid blind detection, known approaches may be used to implement a synchronized switch. However, to further enhance the performance of a synchronized switch, the example in FIG. 8 shows one alternative way of performing a handshake between the UE 22 and the base station 20 on exactly when the switch shall occur.

Specifically in this regard, the RNC 24 sends the UE 22 an order to switch to the 10 ms TTI, i.e., sends a change command 34. The RNC 24 does so by sending a Layer 3 (L3) message, e.g., RRC Radio Bearer Reconfiguration, to the UE 22 containing information for the target configuration and an activation time of "now" with a device-to-base station handshake (Step 401). Alternatively, the configuration information for the 10 ms TTI may be transmitted earlier and saved in the UE 22 as a "stored configuration" so as to reduce the size of the change command. The RNC 24 also informs the base station 20 of the change command/ switching order, e.g., using the Node B Application Part (NBAP) message Radio Link Reconfiguration. If existing RRC and NBAP messages are used, they are extended with the information that a device-to-base station handshake is to be performed.

After receiving the order, the UE 22 prepares for the TTI switch. The UE 22 then starts the handshake (Step 402) by sending a ready signal 28 (referred to here as a Ready to Switch signal) to the base station 20 indicating that the UE 22 is ready to execute the switch. In some embodiments, the Ready to Switch signal indicates that the UE 22 is ready to execute the switch at a predefined time after that signal. Regardless, in response to the Ready to Switch signal, the base station 20 acknowledges the reception of the UE's Ready to Switch signal by sending an Order Signal+Acknowledgement 32 in the form of an HS Order (Step 403). This HS Order orders (i.e., commands or requests) the UE 22 to perform the switch. If the UE 22 has not received this acknowledgement within a predefined length of time, the UE 22 will retransmit the Ready to Switch signal in an effort to complete the handshake with the base station 20. In the embodiment of FIG. 8, the UE 22 and base station 20 agree to synchronously apply the change at the first 10 ms boundary that occurs after a predefined time since the Ready to Switch signal is transmitted or received.

On reception of the Ready to Switch signal from the UE 22, the base station 20 prepares to switch to the 10 ms TTI at the agreed-upon time. The UE 22 and base station 20 then synchronously switch to the 10 ms TTI at the agreed-upon time (Step 404).

The UE 22 next informs the RNC 24 of the switch via a L3 message, e.g., the existing RRC message Radio Bearer Reconfiguration Complete (Step 405). The RNC 24 in turn informs all base stations 20 in the Active Set of the UE 22 of the TTI switch (Step 406), in case some have missed some part of the switching procedure due to poor radio quality.

Figure 9:
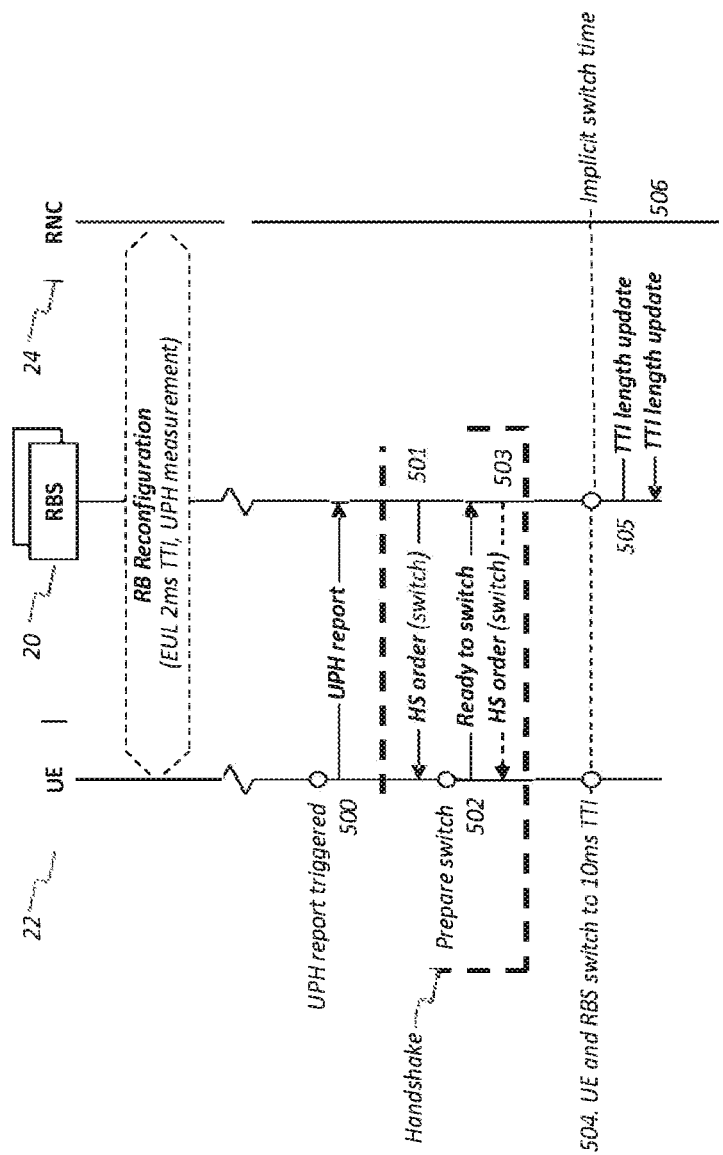
FIG. 9 is a call flow diagram illustrating embodiments from FIGS. 3A, 3B and 4B in the context of a TTI switch.

FIG. 9 shows a second example of embodiments from FIGS. 3A, 3B and 4B in the context of a TTI switch. As shown, the UE 22 is configured from the start with configuration information for both 10 ms and 2 ms TTI, as well as the TTI-switch criteria in terms of UPH measurements. Configured in this way, rather than sending an RRC Measurement Report that includes the UPH report to the RNC 24 as in FIG. 8, the UE 22 sends the UPH report (e.g., in a dedicated message) to the base station 20 (Step 500). Upon reception of the UPH report, signaling the need of a switch to 10 ms TTI, the base station 20 decodes the report without forwarding it to the RNC 24. The base station 20 then directly initiates the handshake by sending an Order Signal 26 (see FIGS. 3A and 3B) to the UE 22 in the form of an HS-SCCH Order (Step 501). This HS-SCCH Order orders (i.e., commands or requests) the UE 22 to execute the TTI switch. This therefore gives the base station 20 better control of the timing of the switch, since the base station 20 is the node actually initiating the handshake. In at least some embodiments, a new HS-SCCH Order is defined specifically for the purposes of ordering the TTI switch. Since the HS-SCCH order does not carry any additional information, the configuration information for the 10 ms TTI must be transmitted ahead of time and stored in the UE.

After receiving the order, the UE 22 prepares for the TTI switch. The UE 22 then participates in the already initiated handshake by sending a ready signal 28 (referred to here as the Ready to Switch signal) to the base station 20 indicating that the UE 22 is ready to execute the switch (Step 502). In embodiments based on FIG. 3A, this completes the handshake. However, in embodiments based on FIG. 3B, the handshake is completed upon the base station 20 sending an acknowledgement 30 in the form of another HS-SCCH Order (Step 503) acknowledging the base station's reception of the Ready to Switch signal. If the UE 22 has not received this acknowledgement within a predefined length of time, the UE 22 will retransmit the Ready to Switch signal in an effort to perform the handshake with the base station 20. Similarly, in at least some embodiments, the base station 20 re-transmits the first HS-SCCH Order (Step 501) if the base station 20 does not receive the Ready to Switch signal within a predefined length of time since sending that HS-SCCH Order.

Notably, the RNC 24 is not directly involved in the switch thus far in FIG. 9. Moreover, interaction with the RRC protocol is eliminated. This further streamlines the process and speeds up the switch. This also reduces the amount of signaling performed.

Of course, the RNC 24 still should be notified about the switch at some point. In FIG. 9, therefore, after a successful switch, the base station 20 attaches the TTI length to the Iub data frame to notify the MAC layer in the RNC 24 to switch to L2 settings that are optimized for the 10 ms TTI. In soft-handover scenarios, the base station 20 in some embodiments informs the RNC 24 of a successful switch, e.g., via a control frame of the Iub frame protocol. The RNC 24 in one embodiment forwards this information likewise to other base stations 20 in case the messages exchanged during the handshake were missed due to temporary bad radio conditions at the other base stations.

Figure 10:
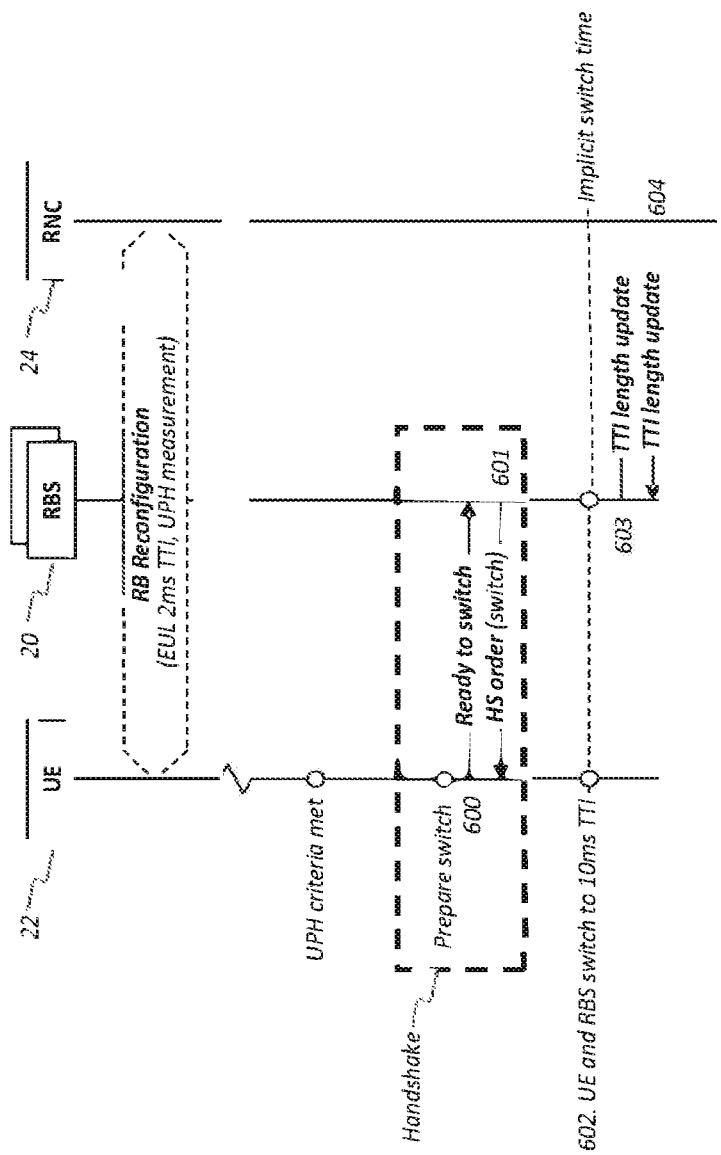
FIG. 10 is a call flow diagram illustrating embodiments from FIGS. 3C and 4C in the context of a TTI switch.

FIG. 10 shows a third example of embodiments from FIGS. 3C and 4C in the context of a TTI switch, making the switch even more dynamic. As shown, responsive to determining that a set of one or more criteria pertaining to the UE's power headroom metric is met (e.g., falls below a defined threshold for a defined length of time), the UE 22 directly starts the handshake to initiate the change. Specifically in this regard, the UE 22 sends the Ready to Switch signal to the base station 20 (Step 600), without first transmitting the UPH report message to the network as in FIGS. 8 and 9. This means that steps 500 and 501 in FIG. 9 are not performed in FIG. 10.

Regardless, in response to the Ready to Switch signal, the base station 20 acknowledges the reception of the UE's Ready to Switch signal by sending an Order Signal+Acknowledgement 32 in the form of an HS Order (Step 601). This HS Order orders the UE 22 to perform the switch. Steps 602-604 in FIG. 10 then proceed in the same way as steps 504-506 in FIG. 9, as described above.

The above examples of course focus on optimizing the 2 ms TTI to 10 ms TTI switch. Optimization as above results in a faster and more robust switch from EUL 2 ms TTI to 10 ms TTI triggered by insufficient coverage for the 2 ms TTI. This maximizes the utilization of the 2 ms TTI of EUL, providing much improved end-user experience as a result. The same tools disclosed in the examples can be used for the switch from the 10 ms TTI back to 2 ms TTI. To avoid too many back-and-forth switches, the threshold for the 10-2 switch can set higher than that of the 2-10 switch to create a hysteresis between the two switches. In addition to providing improved end-user experience, the optimization above also aids the call drop rate by improving the robustness of synchronized reconfigurations in general. The embodiments herein therefore can also be used for improving other synchronized reconfigurations. That is, the handshake procedure introduced herein may be used for enhancing other radio bearer reconfigurations or state transitions that currently require a synchronized procedure.

Figure 11:
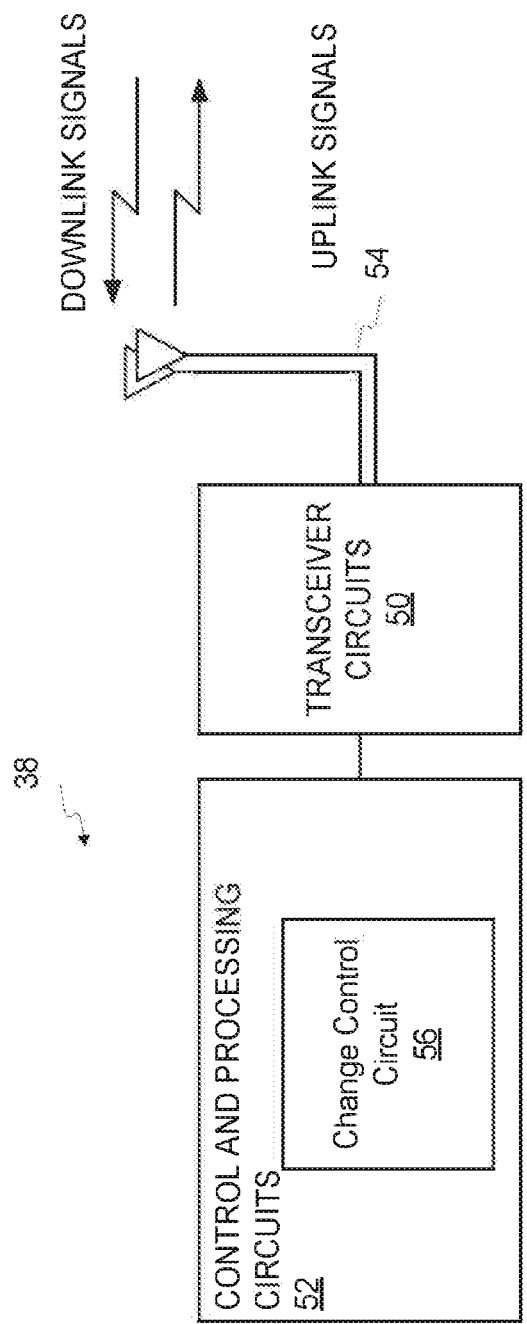
FIG. 11 is a block diagram of a wireless communication device according to one or more embodiments.

In view of the above modifications and variations, those skilled in the art will appreciate that embodiments herein also include corresponding apparatus configured to perform the methods and processing described above. FIG. 11, for example, illustrates a wireless communication device 22 according to one or more embodiments. As shown, the device 22 includes one or more transceiver circuits 50 and one or more processing (and control) circuits 52. The one or more transceiver circuits 50 may include various radio-frequency components (not shown) to receive and process radio signals from one or more base stations 20, via one or more antennas 54, using known signal processing techniques. The one or more processing circuits 52 may comprise one or more microprocessors, digital signal processors, and the like. The one or more processing circuits 52 may also comprise other digital hardware and a memory (e.g., ROM, RAM, cache, flash, etc.) that stores program code for executing one or more communications protocols and for carrying out one or more of the techniques described herein. Of course, not all of the steps of these techniques are necessarily performed in a single microprocessor or even in a single module. Thus, FIG. 11 presents a more generalized view of the processing circuits 52 as functionally including a change control circuit 56 configured to perform the device processing described herein, e.g., in FIGS. 2 and 6. Those skilled in the art will appreciate, though, that the apparatus of FIG. 11 in some embodiments includes one or more functional (software) means or modules for performing the processing described herein, e.g., where different means or modules perform the different processing steps of FIGS. 2 and/or 6. In one such embodiment, these one or more functional means or modules are implemented as a computer program running on a processor.

Figure 12:
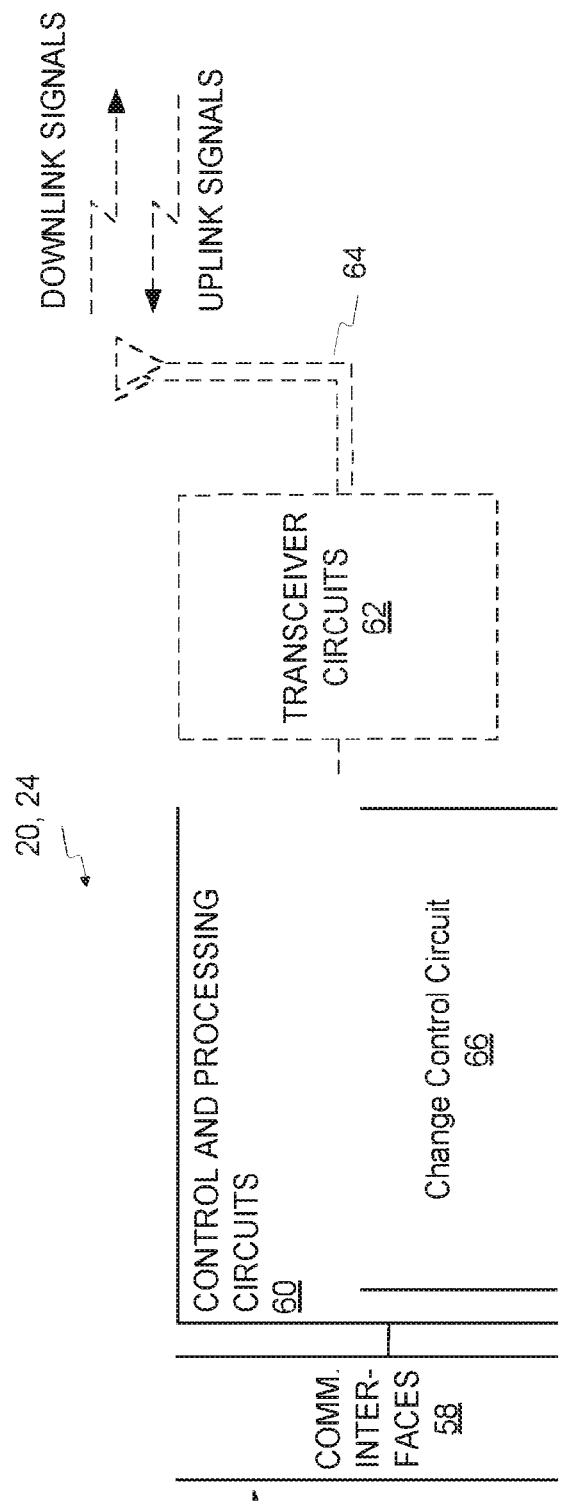
FIG. 12 is a block diagram of a network node (e.g., a base station or an RNC) according to one or more embodiments.

FIG. 12 illustrates a network node (e.g., a base station 20 or RNC 24) according to one or more embodiments. The network node includes one or more communication interfaces 58 and one or more processing (and control) circuits 60. Where the network node is a base station 20, the node also includes one or more transceiver circuits 62. The one or more communication interfaces 58 are configured to communicatively connect the network node to other network nodes. The one or more transceiver circuits 62, where present, may include various radio-frequency components (not shown) to receive and process radio signals from one or more wireless communication devices 22, via one or more antennas 64, using known signal processing techniques. The one or more processing circuits 60 may comprise one or more microprocessors, digital signal processors, and the like. The one or more processing circuits 60 may also comprise other digital hardware and a memory (e.g., ROM, RAM, cache, flash, etc.) that stores program code for executing one or more communications protocols and for carrying out one or more of the techniques described herein. Of course, not all of the steps of these techniques are necessarily performed in a single microprocessor or even in a single module. Thus, FIG. 12 presents a more generalized view of the processing circuits 60 as functionally including a change control circuit 66. Where the node is a base station 20, the change control circuit 66 is configured to perform the method of FIG. 2. Where the node is an RNC 24, the change control circuit 66 is configured to perform the method of FIG. 5. Those skilled in the art will appreciate, though, that the network node of FIG. 12 in some embodiments includes one or more functional (software) means or modules for performing the processing described herein, e.g., where different means or modules perform the different processing steps of FIGS. 2 and/or 5. In one such embodiment, these one or more functional means or modules are implemented as a computer program running on a processor.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Abbreviations

CFN Connection Frame Number
DPCCH Dedicated Physical Control Channel
E-DCH Enhanced Dedicated Channel
E-DPCCH E-DCH Dedicated Physical Control Channel
E-DPDCH E-DCH Dedicated Physical Data Channel
E-TFCI E-DCH Transport Format Combination Indicator
EUL Enhanced Uplink
HARQ Hybrid Automatic Repeat Request
HS-SCCH HS-DSCH Shared Control Channel
L2 Layer 2 (data link layer)
L3 Layer 3 (network layer)
RNC Radio Network Controller
SI Scheduling Information
TTI Transmission Time Interval
TTT Time-to-trigger UL Uplink
UPH UE Power Headroom

What is claimed is:

1. A method for applying a change to a configuration or state of a radio bearer, the radio bearer supporting the transfer of data over a radio connection between a wireless communication device and a base station with defined data transfer characteristics, the method performed by a first device that is one of: i) the wireless communication device and ii) the base station, the method comprising:

the first device performing a handshake with a second device that is the other one of: i) the wireless communication device and ii) the base station to agree on a time to synchronously apply the change at the wireless communication device and the base station, wherein the handshake comprises the first device transmitting a first signal and obtaining a second signal that is responsive to the first signal, wherein the agreed-on time is after the first and second signal of the handshake; and in accordance with the agreement, the first device synchronously applying the change at the agreed-on time.

2. The method of claim 1, wherein the handshake includes the wireless communication device sending a ready signal to the base station indicating to the base station that the wireless communication device is ready to apply the change.

3. The method of claim 2, wherein the ready signal comprises an out-of-band control signal transmitted without an accompanying data channel, wherein the out-of-band control signal is nominally configured to indicate one or more characteristics associated with such an accompanying data channel but indicates one or more characteristics that are not expected to be or that cannot be associated with any accompanying data channel.

4. The method of claim 3, wherein the out-of-band control signal indicates a transport format combination that is not expected to be or that cannot be a transport format combination for any accompanying data channel.

5. The method of claim 1, wherein the handshake includes the base station sending the wireless communication device an order signal ordering the wireless communication device to perform the change.

6. The method of claim 5, wherein the order signal comprises a High Speed Downlink Shared Channel, HS-DSCH, Shared Control Channel, HS-SCCH, order.

7. The method of claim 1, wherein the handshake includes the wireless communication device sending a ready signal to the base station indicating to the base station that the wireless communication device is ready to apply the change, and includes the base station, responsive to receiving the ready signal, sending the wireless communication device an order signal ordering the wireless communication device to perform the change.

8. The method of claim 1, wherein the time at which the wireless communication device and the base station agree to synchronously apply the change is defined relative to when a signal utilized for the handshake is transmitted or received.

9. The method of claim 1, wherein performing the handshake comprises initiating the handshake responsive to receiving a change command from a radio network controller directing that the change be applied as soon as possible and that the handshake be initiated, wherein the change command does not indicate a specific time for application of the change.

10. The method of claim 1, further comprising evaluating whether a set of one or more criteria has been met pertaining to one or more metrics computed by the wireless communication device, and wherein performing the handshake comprises determining to initiate the handshake in response to determining that the set of one or more criteria has been met.

11. The method of claim 10, wherein the one or more metrics comprises a power headroom metric that indicates an amount of power available at the wireless communication device for transmitting data to the base station, and wherein the evaluating comprises evaluating whether the power headroom metric has fallen below a defined threshold for at least a defined length of time.

12. The method of claim 1, wherein the change is a change in the length of a transmission time interval of the radio bearer.

13. An apparatus configured to apply a change to a configuration or state of a radio bearer, the radio bearer supporting the transfer of data over a radio connection between a wireless communication device and a base station with defined data transfer characteristics, the apparatus being one of: i) the wireless communication device and ii) the base station, the apparatus comprising:

one or more transceiver circuits configured to transmit and receive signals via one or more antennas; and one or more processing circuits configured to:

perform a handshake with a second device that is the other one of: i) the wireless communication device and ii) the base station to agree on a time to synchronously apply the change at the wireless communication device and the base station, wherein the handshake comprises the first device transmitting a first signal and obtaining a second signal that is responsive to the first signal, wherein the agreed-on time is after the first signal and the second signal of the handshake; and in accordance with the agreement, synchronously apply the change at the time.

14. The apparatus of claim 13, wherein the handshake includes the wireless communication device sending a ready signal to the base station indicating to the base station that the wireless communication device is ready to apply the change.

15. The apparatus of claim 14, wherein the ready signal comprises an out-of-band control signal transmitted without an accompanying data channel, wherein the out-of-band control signal is nominally configured to indicate one or more characteristics associated with such an accompanying data channel but indicates one or more characteristics that are not expected to be or that cannot be associated with any accompanying data channel.

16. The apparatus of claim 15, wherein the out-of-band control signal indicates a transport format combination that is not expected to be or that cannot be a transport format combination for any accompanying data channel.

17. The apparatus of claim 13, wherein the handshake includes the base station sending the wireless communication device an order signal ordering the wireless communication device to perform the change.

18. The apparatus of claim 17, wherein the order signal comprises a High Speed Downlink Shared Channel, HS-DSCH, Shared Control Channel, HS-SCCH, order.

19. The apparatus of claim 13, wherein the handshake includes the wireless communication device sending a ready signal to the base station indicating to the base station that the wireless communication device is ready to apply the change, and includes the base station, responsive to receiving the ready signal, sending the wireless communication device an order signal ordering the wireless communication device to perform the change.

20. The apparatus of claim 13, wherein the time at which the wireless communication device and the base station agree to synchronously apply the change is defined relative to when a signal utilized for the handshake is transmitted or received.

21. The apparatus of claim 13, wherein the one or more processing circuits are further configured to initiate the handshake responsive to receiving a change command from a radio network controller directing that the change be applied as soon as possible and that the handshake be initiated, wherein the change command does not indicate a specific time for application of the change.

22. The apparatus of claim 13, wherein the one or more processing circuits are further configured to:
evaluate whether a set of one or more criteria has been met pertaining to one or more metrics computed by the wireless communication device; and
determine to initiate the handshake in response to determining that the set of one or more criteria has been met.

23. The apparatus of claim 22, wherein the one or more metrics comprises a power headroom metric that indicates an amount of power available at the wireless communication device for transmitting data to the base station, and wherein the one or more processing circuits are further configured to evaluate whether the power headroom metric has fallen below a defined threshold for at least a defined length of time.

24. The apparatus of claim 13, wherein the change is a change in the length of a transmission time interval of the radio bearer.

25. A wireless communication device configured to change a configuration or state of a radio bearer, the radio bearer supporting the transfer of data over a radio connection between the wireless communication device and a base station with defined data transfer characteristics, the wireless communication device comprising:
one or more transceiver circuits configured to transmit signals and to receive signals via one or more antennas; and
one or more processing circuits configured to:
determine whether a set of one or more criteria has been met; and,
in response to determining that the set of one or more criteria has been met, initiate a handshake between the wireless communication device and the base station in order to agree on a time for the wireless communication device and the base station to synchronously apply a change to the configuration or state of the radio bearer, wherein the handshake is initiated after the wireless communication device transmits a trigger message to the base station or is initiated without the wireless communication device first transmitting any trigger message to the base station.

26. The device of claim 25, wherein the trigger message comprises a signal indicating the occurrence of a particular event.

27. The device of claim 25, wherein the one or more criteria comprises one or more of: the wireless communication device operating at a maximum output power for a predetermined amount of time or a power headroom of the wireless communication device indicating that a power headroom metric has fallen below a defined threshold.

28. A method for changing a configuration or state of a radio bearer, the radio bearer supporting the transfer of data over a radio connection between a wireless communication device and a base station with defined data transfer characteristics, the method comprising:
evaluating, by the wireless communication device, whether a set of one or more criteria has been met; and,
in response to determining that the set of one or more criteria has been met, initiating, by the wireless communication device, a handshake between the wireless communication device and the base station in order to agree on a time for the wireless communication device and the base station to synchronously apply a change to the configuration or state of the radio bearer, wherein the handshake is initiated after the wireless communication device transmits a trigger message to the base station or is initiated without the wireless communication device first transmitting any trigger message to the base station.

29. A device configured to change a configuration or state of a radio bearer, the radio bearer supporting the transfer of data over a radio connection between a wireless communication device and a base station with defined data transfer characteristics, the device comprising one of a base station or a radio network controller (RNC) and further comprising:
one or more transceiver circuits configured to transmit signals and to receive signals via one or more antennas; and
one or more processing circuits configured to:
obtain a trigger message from the wireless communication device, the trigger message comprising a signal indicating that one or more criteria has been met pertaining to one or more metrics computed by the wireless communication device; and
in response to obtaining the trigger message, initiate a handshake between the wireless communication device and the base station in order to agree on a time for the wireless communication device and the base station to synchronously apply a change to the configuration or state of the radio bearer.

30. A method performed by one of a base station or a radio network controller for changing a configuration or state of a radio bearer, the radio bearer supporting the transfer of data over a radio connection between a wireless communication device and a base station with defined data transfer characteristics, the method comprising:
obtaining a trigger message from the wireless communication device, the trigger message comprising a signal indicating that one or more criteria has been met pertaining to one or more metrics computed by the wireless communication device; and
in response to obtaining the trigger message, initiating a handshake between the wireless communication device and the base station in order to agree on a time for the wireless communication device and the base station to synchronously apply a change to the configuration or state of the radio bearer.

31. A method for applying a change to a configuration or state of a radio bearer, the radio bearer supporting the transfer of data over a radio connection between a wireless communication device and a base station with defined data transfer characteristics, the method performed by a first device that is one of: i) the wireless communication device and ii) the base station, the method comprising:
the first device performing a handshake with a second device that is the other one of: i) the wireless communication device and ii) the base station to agree on a time to synchronously apply the change at the wireless communication device and the base station, wherein the handshake comprises the first device obtaining a first signal and transmitting a second signal that is responsive to the first signal, wherein the agreed-on time is after the first and second signal of the handshake; and in accordance with the agreement, the first device synchronously applying the change at the agreed-on time.

32. An apparatus configured to apply a change to a configuration or state of a radio bearer, the radio bearer supporting the transfer of data over a radio connection between a wireless communication device and a base station with defined data transfer characteristics, the apparatus being one of: i) the wireless communication device and ii) the base station, the apparatus comprising:

one or more transceiver circuits configured to transmit and receive signals via one or more antennas; and one or more processing circuits configured to:

perform a handshake with a second device that is the other one of: i) the wireless communication device and ii) the base station to agree on a time to synchronously apply the change at the wireless communication device and the base station, wherein the handshake comprises the first device obtaining a first signal and transmitting a second signal that is responsive to the first signal, wherein the agreed-on time is after the first signal and the second signal of the handshake; and in accordance with the agreement, synchronously apply the change at the time.

* * * * *